United States Patent
Durbin et al.

[15] 3,651,290
[45] Mar. 21, 1972

[54] GRAVITY SWITCH ASSEMBLY

[72] Inventors: Larry E. Durbin; Robert Thomas, both of Houston, Tex.

[73] Assignee: Big Three Industrial Gas & Equipment Co.

[22] Filed: June 1, 1970

[21] Appl. No.: 42,242

[52] U.S. Cl. ...................200/61.45, 200/61.46, 219/60 A, 340/282
[51] Int. Cl. ...................................................H01h 35/02
[58] Field of Search .............200/61.46, 61.48, 61.52, 61.45, 200/61.51; 219/60.1; 340/282

[56] References Cited

UNITED STATES PATENTS

| 3,126,471 | 3/1964 | Nelson | 219/60 A |
| 3,319,019 | 5/1967 | Jullien-Davin | 200/38 |
| 2,946,868 | 7/1960 | Kowalyshyn, Jr. et al. | 200/61.48 |
| 2,721,238 | 10/1955 | Ferris | 200/61.51 |
| 3,207,881 | 9/1965 | Pagan | 219/60 A |
| 3,348,792 | 10/1967 | Porter | 200/61.52 |

Primary Examiner—J. V. Truhe
Assistant Examiner—George A. Montanye
Attorney—Pravel, Wilson & Matthews

[57] ABSTRACT

A gravity actuated control apparatus useful in controlling the operation of pipe welding equipment or other equipment used on pipes, beams, or other members, which control apparatus is actuated by gravity to generate triggering or control operations at preselected points along the periphery of the pipe or other member. The assembly uses switches, or other suitable control mechanisms, which are selectively engageable in accordance with the angular position of the control apparatus with respect to the member, to initiate and terminate operations of the equipment and to properly position such equipment with respect to the member.

12 Claims, 10 Drawing Figures

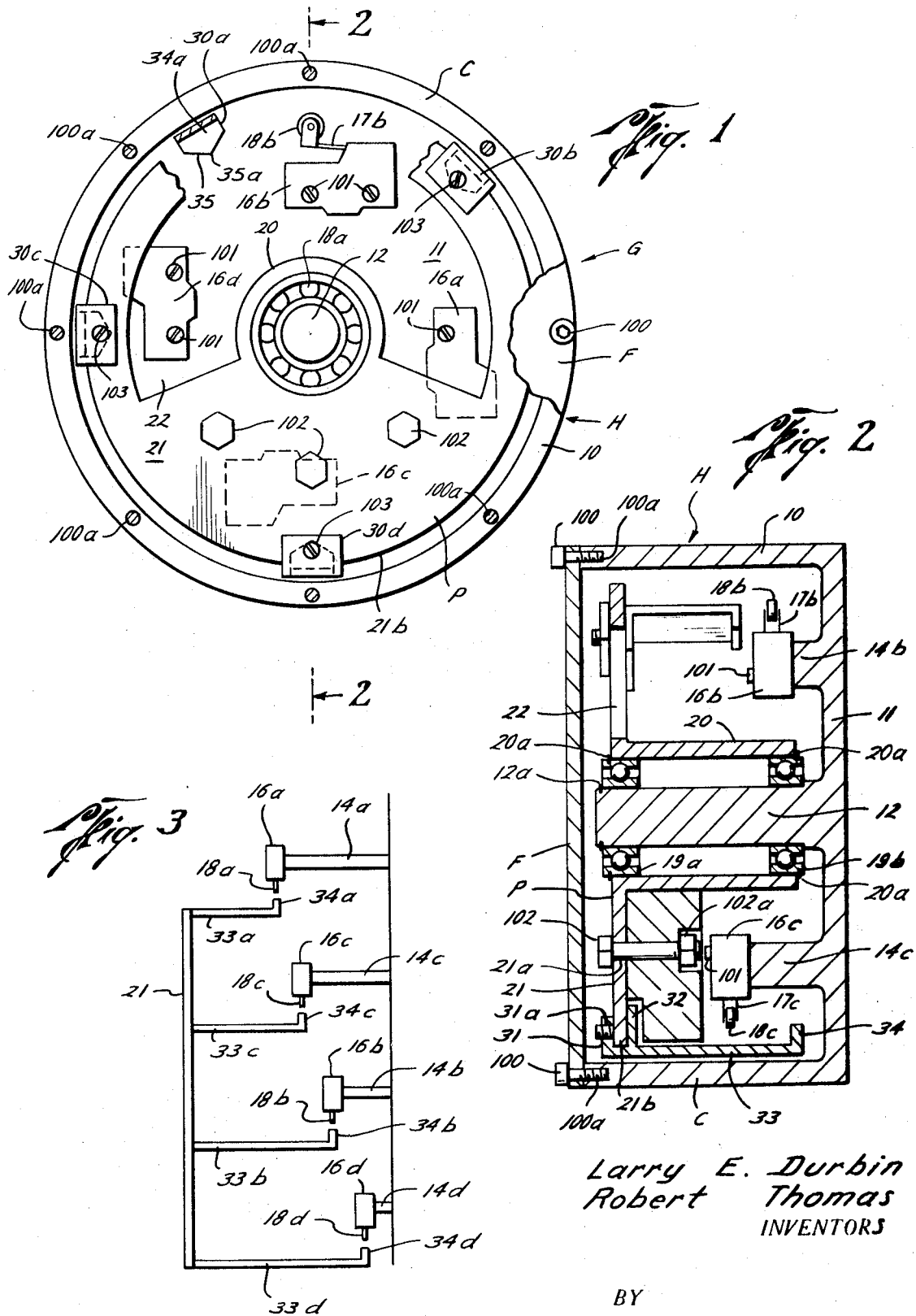

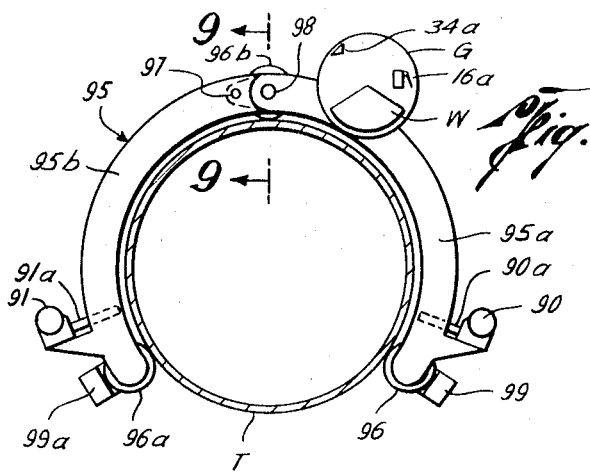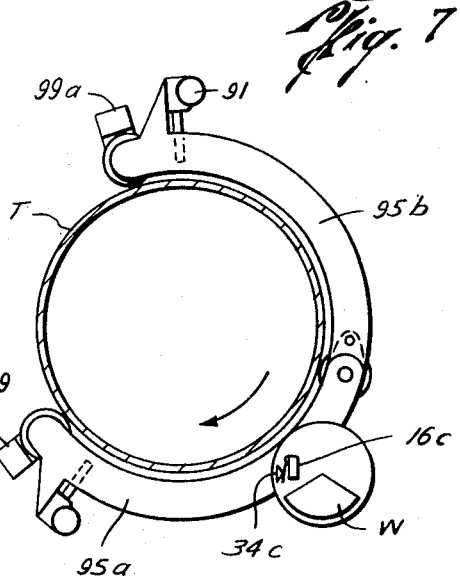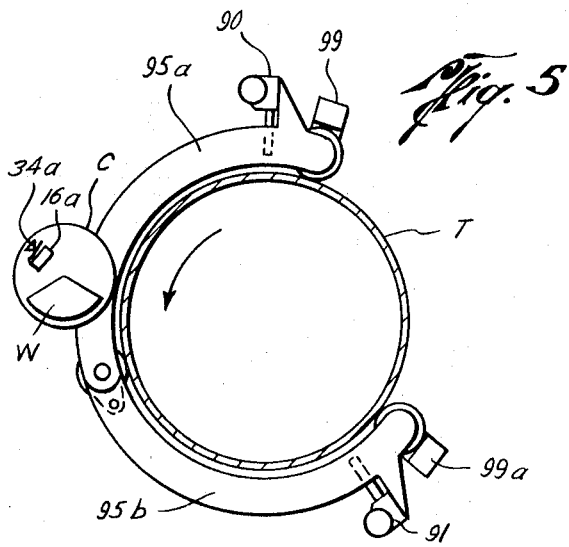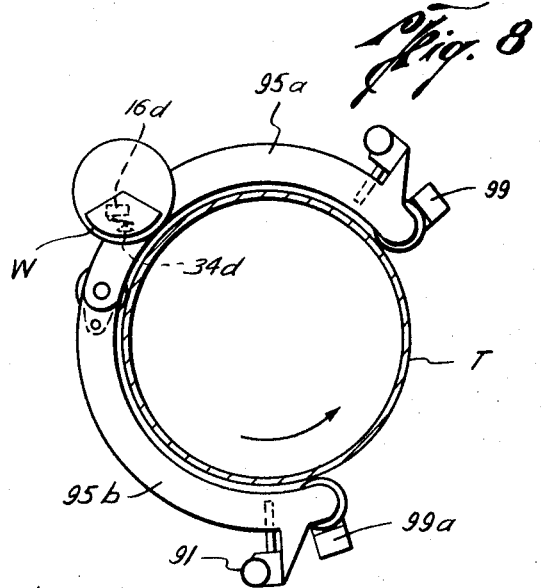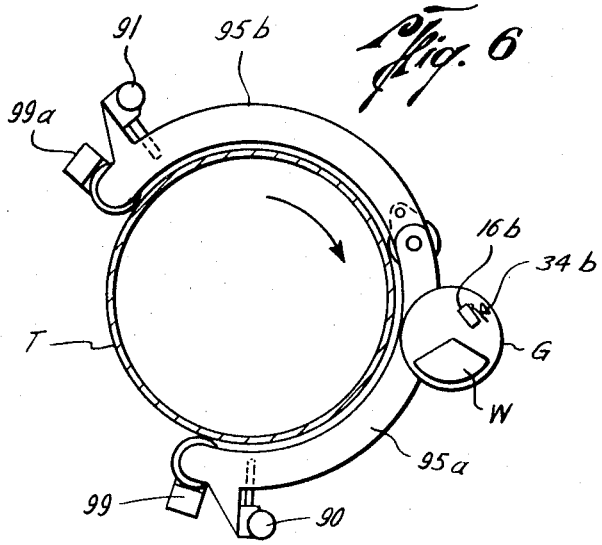

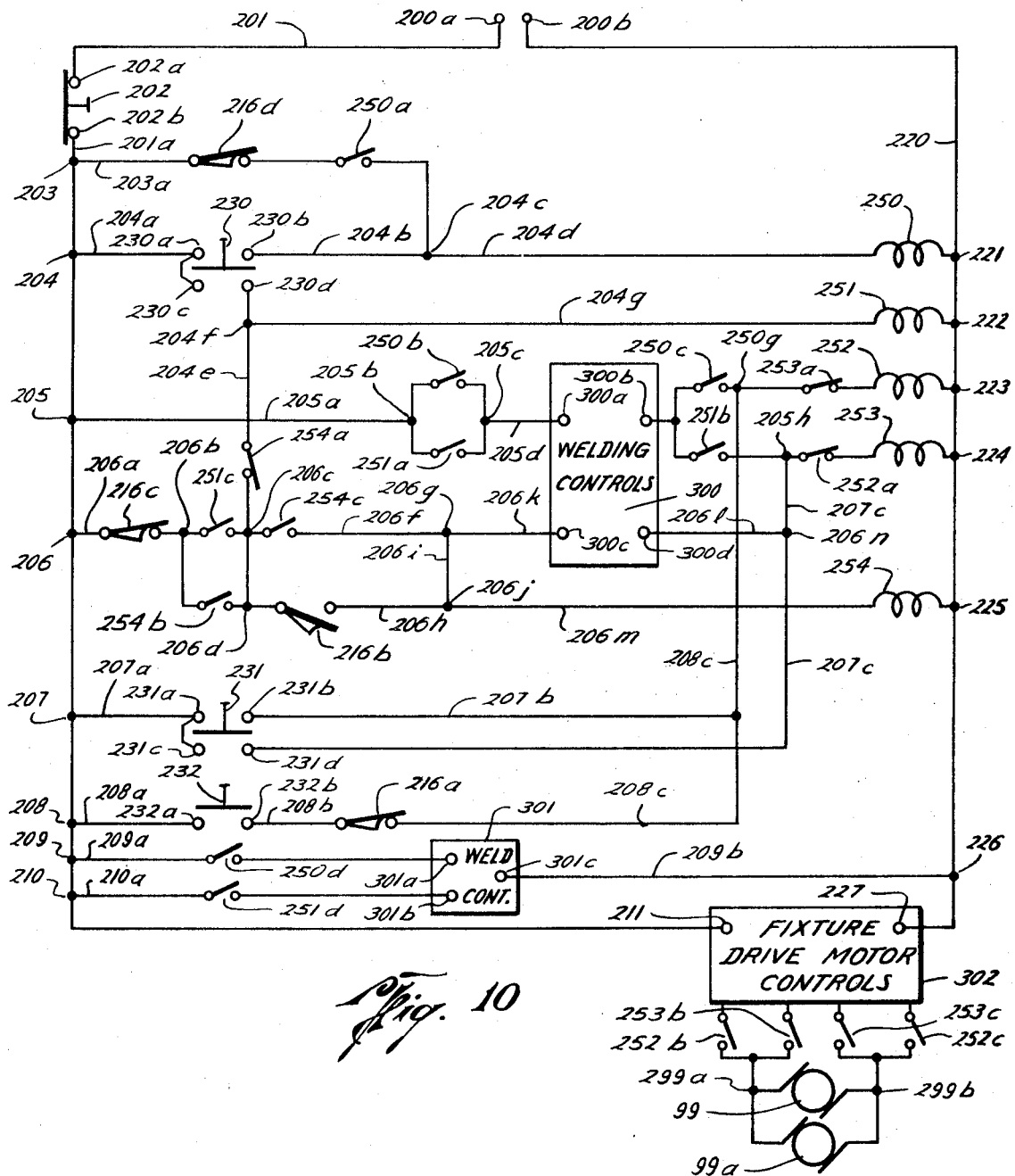
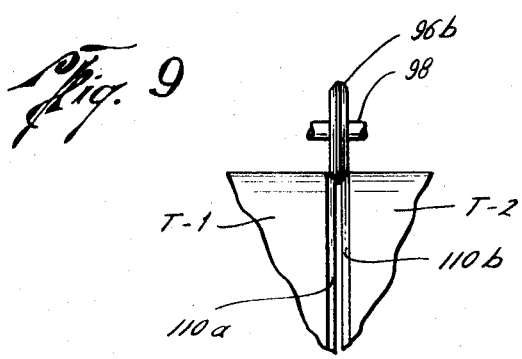

3,651,290

GRAVITY SWITCH ASSEMBLY

BACKGROUND OF THE INVENTION

The present invention relates to a gravity actuated apparatus to initiate operations of a welder or other equipment at selected points in its movements relative to pipe or other member.

In the prior art, such as U.S. Pat. Nos. 2,861,789; 2,966,564; 2,991,339; 3,144,528; and 3,246,092, the detection of acceleration or deceleration of a vehicle or other moving body was accomplished by the use of accelerometers which contained weights eccentrically mounted with respect to the remainder of such accelerometer. In U.S. Pat. No. 3,449,632, an apparatus for preventing short-circuits in the electrical system, and possible fires, in an overturned automobile was provided by an eccentrically mounted weight which opened an electrical switch in the automobile's ignition system which the automobile overturned. Thus, so far as known, such prior art has been concerned primarily with detecting changes in angular velocity as opposed to the amount of angular displacement, or it has been concerned with constrained movement of the weight so as to move only under one set of conditions. The problem of sensing the angular position of equipment to which the sensing device is attached, and to initiate electrical control sequences at any of a number of discrete adjustable angular orientations of said equipment has thus remained unsolved.

SUMMARY OF THE INVENTION

With the present invention, a gravity actuated control apparatus provides for the initiation or triggering of the operation of equipment at preselected locations relative to a pipe or other member. The gravity actuated control apparatus includes a gravity actuated control unit which is adapted to be mounted on a carriage for circumferential or other peripheral movements of the unit relative to the member with which it is mounted.

BRIEF DESCRIPTION OF THE DRAWINGS

FIG. 1 is an elevational view of the gravity actuated control unit of the present invention with portions removed for clarity;

FIG. 2 is a cross-sectional view taken along the line 2—2 of FIG. 1;

FIG. 3 is a diagrammatic representation of the operation of the cam switches of the control unit of the present invention;

FIGS. 4, 5, 6, 7 and 8 are cross-sectional views of the gravity actuated control apparatus of the present invention illustrating the control of the operation of a pipe welder;

FIG. 9 is a cross-sectional view taken along the vertical axis line 9—9 of FIG. 4; and FIG. 10 is an electrical circuit diagram of a typical control circuit of the gravity actuated control apparatus of the present invention.

DESCRIPTION OF THE PREFERRED EMBODIMENT

In the drawings, the letter G designates generally one form of the gravity actuated control unit of the present invention, which when mounted with pipe welding equipment or other equipment on a pipe or other member serves to initiate or trigger an electrical circuit or other control circuit at preselected positions of the unit relative to the pipe or other member to thereby control movements of the equipment with respect to the member, as will be more evident hereinafter.

Considering the invention more in detail, the gravity actuated control unit G (FIGS. 1 and 2) includes a housing or support H, which includes a canister C and a face plate F attached to the canister C by bolts 100 or other suitable attaching devices. The face plate F has been removed from the canister C in FIG. 1 to illustrate the contents of the housing or support H.

The canister C is made of aluminum or other suitable material by casting or other suitable techniques, and comprises an annular cylinder defined by a cylindrical exterior wall member 10, a rear wall member 11 affixed substantially perpendicular to the cylindrical wall member 10, and a cylindrical interior rod 12, extending substantially perpendicular from the center of the rear wall member 11 into the space defined by the cylindrical exterior wall member 10 and the rear wall member 11. A plurality of sockets or openings 100a are formed axially extending into the cylindrical exterior wall member 10 to allow insertion of bolts 100 or other suitable means to attach the face plate F to the canister C.

A plurality of bosses or flanges 14a, 14b, 14c and 14d axially extend from the rear wall member 11 into the annular space defined by the wall members 10 and 11 and the rod 12, each of which flanges is a different length, for a reason to be later discussed.

Switches 16a, 16b, 16c and 16d, each having an arm 17 to which is attached a wheel 18 or other suitable means for engaging cams of the gravity switch assembly in a manner to be later discussed, and mounted to the flanges 14a through 14d, respectively.

A plurality of radial ball bearings 19a and 19b are circumferentially mounted with respect to the cylindrical rod 12. The ball bearings may be held in position with respect to the rod 12 by a snapring 12a or other suitable device, so as to allow a rotatable gravity controlled actuating assembly P to be in freely rotatable engagement with respect to the canister C for reasons to be later discussed.

The assembly P is made of aluminum or other suitable material by casting or other suitable techniques, and it has a cylindrical wall member 20 and a plate 21. The wall member 20 is concentrically mounted with respect to the cylindrical rod 12 and the ball bearings 19a and 19b, and is held in position with respect to the ball bearings 19a and 19b by snaprings 20a or other suitable devices.

The plate 21 is somewhat smaller in outside diameter than the inner diameter of the cylindrical wall member 10 to allow insertion of the assembly P into the interior of the annular space formed by the cylindrical wall member 10 and the cylindrical rod 12.

A curved aperture 22 is formed in the plate 21, by removal of a curved radial portion of such plate, to create responsiveness of the gravity actuated control unit G to adjustments in position, by converting the remaining portion of plate 21 into a weighted mass eccentrically mounted with respect to the rod 12. As viewed in FIG. 1, the upper portion of the plate 21 enclosing the aperture 22 has been omitted from the drawing (FIG. 1) to more clearly illustrate the arm 17b and engaging means 18b of the switch 16b, which would otherwise be partially hidden in FIG. 1.

A plurality of apertures 21a are formed in the surface of the plate 21 opposite the aperture 22 for passage therethrough of a plurality of bolts 102 or other suitable means for attaching a weight W. The weight W may be made of lead or other suitable material, preferably somewhat denser and heavier than the assembly P, and affixed to the bolts 102 by a plurality of nuts 102a or other suitable means, or the weight W may be formed integral with respect to, and of the same material as the plate 21.

The freely unconstrained rotatable engagement of the assembly P with respect to the canister C causes the solid portion of the plate 21 as well as the weight W to remain in a position closest to the earth due to its weight at all times, so that the canister C will consequently rotate without restraint relative to the assembly P as the gravity actuated control unit G is moved in a curved path, as hereinafter more fully discussed.

A plurality of actuating members or cams 30, individually designated 30a, 30b, 30c and 30d, are adjustably attached at selected locations around the periphery 21b of the plate 21 by screws 103, bolts, or other suitably adjustable means, at preselected positions to engage the engagement means 18a, 18b, 18c, and 18d, of switches 16a, 16b, 16c and 16d, respectively. Each of the cams 30 has a pair of radially inwardly extending arms 31 and 32 which comprise a clevis into which the periphery 21b of the assembly P is positioned, and the arm 31 has an aperture 31a therein for insertion of the screws or bolt 103. Each of the cams 30 has an arm 33 extending inwardly into the annular space defined by the wall member 10 and the rod 12 of the canister C with respect to the plate 21. At the end of such arm 33 opposite the plate 21 is a radially inwardly extending engaging arm 34 which may comprise a wedge shaped member (FIG. 1) with engagement surfaces 35 and 35a. The length of each of the arms 33 is of a predetermined length, so that only one of each of the arms 34 contacts one of the switches 16. Due to the adjustability of each of the actuating members 30 on the plate 21, the angular location thereof and the point of contact with one of the switches 16 may be preselected.

Referring to FIG. 3, it can be seen that the flanges 14a, 14b, 14c and 14d and the cam arms 33a, 33b, 33c and 33d are designed so that the engaging arms 34a, 34b, 34c and 34d will each engage only engagement means 18a, 18b, 18c and 18d, respectively. It should be recognized that FIG. 3 is only a diagrammatic representation, and that although all four engaging arms 34a, 34b, 34c and 34d are shown as being simultaneously in alignment with engagement means 18a, 18b, 18c and 18d, respectively, in the actual operation of the invention to be later discussed, only one such engaging arm 34a, 34b, 34c and 34d will be positioned in alignment with engagement means 18a, 18b, 18c and 18d, respectively, under the control of the control unit G.

In FIG. 4, the gravity actuated control apparatus of the present invention is shown, controlling welding equipment comprising a plurality of welders 90 and 91 of any suitable construction mounted for peripheral movements with respect to a member, in this instance, a pipe or tubing T to be welded. A curved carriage 95, preferably formed by a plurality of pivotally connected arcuate arms 95a and 95b, which are pivotally mounted with respect to each other at a pin 98 or other pivotal connection means, is positioned circumferentially enclosing a portion of the exterior surface of the tubing T. After the arms have been positioned enclosing the tubing T, a pin, bolt, cotter key or other suitable locking device 97 is inserted to prevent further pivotal movement of the arms 95 and 95a with respect to each other, and to maintain such arms circumferentially enclosing the tubing T. A plurality of wheels or rollers 96, 96a and 96b are mounted on the carriage 95 and are rotatably movable with respect thereto to facilitate movement of such carriage 95 with respect to the tubing T under control of a plurality of drive motors 99 and 99a. The welding devices 90 and 91 and their respective associated welding torches 90a and 91a are fixedly mounted on the arms 95a and 95b, respectively. The control unit G is welded, bolted or otherwise mounted on the carriage 95 for movement therewith. The plate 21 and the weight W, due to the freely adjustable rotatable engagement of the rotatable assembly P within canister C, and the force of gravity acting thereon, will always assume the lowermost position within the canister C, as previously explained. When the pin 98, which serves as an axle for the wheel 96b, is positioned substantially vertically above the center of the tubing T, the position of engaging arm 34a with respect to the engaging means 18a of switch 16a will be as illustrated in FIG. 4. To preserve clarity in the drawings and to simplify description of the operation of the invention, only selected ones of the engaging arms 34 and switches 16 are shown in each of FIGS. 4—8.

In FIG. 5, the control unit G is shown after it has been moved in a counterclockwise direction with the carriage 95 with respect to the tubing T from the position of FIG. 4 for an arcuate distance corresponding to an angle of approximately 135° under control of the drive motors 99 and 99a. The weight W, which constantly seeks the lowermost position due to gravity acting thereon, has rotated the assembly P a corresponding angle of 135° with respect to the canister C to a position where the engaging arm 34a contacts the engaging means 18a of the switch 16a and the welder 90 is positioned above the vertical axis of the tubing T for the beginning of the welding operation of the right hand portion of the tubing T (as viewed in FIGS. 4—8) using the torch 90, as will be explained more in detail.

In FIG. 6, control unit G and the welder 90 have been rotated an arcuate distance of approximately 180° clockwise with respect to the tubing T from the position of FIG. 5, to a position wherein the weight W, always remaining in the lowermost position within the canister C, has moved the assembly P with respect to the canister C to a position where the engaging arm 34b contacts the engaging means 18b of the switch 16b. During the movement of the torch 90 from FIG. 5 to FIG. 6, the right hand half of a circle seam is welded.

In FIG. 7, the control unit G and welding torch 90 have been rotated an additional arcuate distance of approximately 30° clockwise with respect to the tubing T from the position of FIG. 6, wherein the weight W, again seeking the lowermost position within the canister C, has moved the assembly P with respect to the canister C to a position where the engaging arm 34c contacts the engaging means 18c of the switch 18c, and the welder 91 is positioned above the vertical axis of the tubing T in position for beginning the welding operation on the left hand half of the pipe T.

In FIG. 8, the control unit G and the welder 91 have been rotated approximately 180° counterclockwise with respect to the tubing T from the position of FIG. 7, wherein the weight W, again seeking the lowermost position within the canister C, has moved the assembly P with respect to the canister C to a position where the engaging arm 34d contacts the engaging means 18d of the switch 16d. During the movement of the welding torch 91 from FIG. 7 to FIG. 8, the left hand half of the circle seam for the pipe T is welded, as explained hereinafter.

In FIG. 9, a pair of beveled edges 110a and 110b formed along the ends of adjacent sections T-1 and T-2 of the tubing T to be welded together are illustrated, together with one wheel 96b and its axle 98. The wheel 96b as well as the other wheels 96 and 96a are thus able to ride along such beveled edges 110 a and 110b around the tubing T more easily in the operation of the invention to be later discussed. However, it should be understood that the wheels 96, 96a and 96b may move in a track (not shown) or be otherwise guided than by the beveled surfaces 110a and 110b, so long as arcuate movement of the carriage 95 is permitted.

In FIG. 10, a suitable electrical control circuit for the disclosed embodiment of the gravity actuated control apparatus of the present invention receives electrical power from a suitable electrical power supply (not shown) at the terminals 200a and 200b. An electrical conductor 201 connects the terminal 200a to a terminal 202a of "STOP" switch 202. An electrical conductor 201a connects a terminal 202b of "STOP" switch 202 to a plurality of terminals 203, 204, 205, 206, 207, 208, 209, 210 and 211, while an electrical conductor 220 connects the terminal 200b to a plurality of terminals 221, 222, 223, 224, 225, 226 and 227.

An electrical conductor 203a serially connects a normally closed electrical switch 216d, which operates under the control of the switch 16d of the gravity switch assembly G, and a normally open contact 250a of a "WELD FORWARD" relay 250, between the terminal 203 and a terminal 204c.

An electrical conductor 204a connects the terminal 204 to a plurality of contacts 230a and 230c of three position "WELD" switch 230, shown in the intermediate (or unengaged) of its three positions in FIG. 10. When the "WELD" switch 230 is engaged in the "FORWARD" position (uppermost), an electrical connection is formed between the contact 230a and a contact 230b, and when engaged in the "REVERSE" position (lowermost), an electrical connection is formed between the contact 230c and a contact 230d.

An electrical conductor 204b connects the terminals 230b and 204c, and an electrical conductor 204d and the "WELD FORWARD" relay 250 are serially connected between the terminals 204c and 221.

An electrical conductor 204e connects a terminal 204f and a normally closed contact 254a of a relay 254 between the terminal 230d and a terminal 206c, with an electrical conductor 204g and a "WELD REVERSE" relay 251 being serially connected between the terminals 204f and 222.

An electrical conductor 205a connects a terminal 205b and the terminal 205. A normally open contact 250d of the "WELD FORWARD" relay 250 and a normally open contact 251a of the "WELD REVERSE" relay 251 are connected in parallel between the terminal 205b and a terminal 205c, which is connected by an electrical conductor 205d through a terminal 300a of the welding controls 300.

Since the particular arrangement of the welding control circuitry depends upon the particular type and model of welding apparatus used with the control unit G of the present invention, and since many of such arrangements are known to those of ordinary skill in the art, the contents of the welding circuits 300 and 301 have been symbolically indicated as boxes 300 and 301 to preserve clarity in the description of operation of the present invention.

A series electrical circuit comprising a normally open contact 250c of the "WELD FORWARD" relay 250, a terminal 205g, a normally closed contact 253a of a "REVERSE" relay 253, and a "FORWARD" relay 252 connects a terminal 300b of weld controls 300 to the terminal 223.

A series electrical circuit comprising a normally open contact 251b of the "WELD REVERSE" relay 251, a terminal 205h, a normally closed contact 252a of the "FORWARD" relay 252, and the "REVERSE" relay 253 connects the terminal 205f to the terminal 224.

An electrical conductor 206a and a normally closed electrical switch 216c, which operates under the control of the switch 16c of the control unit G, are serially connected between the terminal 206 and a terminal 206b. A normally open contact 251c of the relay 251 electrically connects the terminals 206b and 206c, and a normally open contact 254b of the relay 254 electrically connects the terminal 206b and a terminal 206d. The terminals 206c and 206d are electrically connected by a conductor 206e.

A normally open contact 254c of the relay 254 and an electrical conductor 206f are serially connected between the contact 206c and a contact 206g. An electrical conductor 206h and a normally open contact 216b, which operates under the control of the switch 16b of the control unit G, are serially connected between the terminal 206d and a terminal 206j. The terminals 206g and 206j are electrically connected by a conductor 206i. A conductor 206k electrically connects terminal 206g to a terminal 300c of welding controls 300. A conductor 206l electrically connects a terminal 300d of welding controls 300 to a terminal 206n, which is connected by a portion of electrical connector 207c to the terminal 205h.

A conductor 206n and the relay 254 are serially connected between the terminals 206j and 225. An electrical conductor 207a connects the terminal 207 to a plurality of terminals 231a and 231c of a three position "TRAVEL" switch 231 shown in its unengaged (intermediate) position. When the "TRAVEL" switch 231 is engaged in the "FORWARD" position (uppermost), an electrical connection is formed between the terminal 231a and a terminal 231b of such switch, and when the "TRAVEL" switch 231 is engaged in the "REVERSE" position (lowermost), an electrical connection is formed between the terminal 231c and a terminal 231d of such switch.

An electrical conductor 207b connects the terminal 231b to a terminal 207d, which terminal is electrically connected by a portion of a conductor 208c to the terminal 205g. An electrical conductor 207c connects the terminal 231d to the terminals 206n and 205h.

An electrical conductor 208a connects a terminal 232a of a normally open "CYCLE START" switch 232 to the terminal 208. An electrical conductor 208b connects a terminal 232b of switch 232 to a normally closed electrical switch 216a, which operates under the control of the switch 16a of the control unit G, and an electrical conductor 208c connects the switch 216a to the terminals 207d and 205g. An electrical conductor 209a and a normally open contact 250d of the relay 250 are serially connected between the terminal 209 and a terminal 301a of a portion of the welding controls, shown symbolically as 310.

An electrical conductor 210a and a normally open contact 251d of the relay 251 are serially connected between the terminal 210 and a terminal 301b of a portion of the welding controls, shown symbolically as 301.

An electrical conductor 209b connects a terminal 301c of the welding controls 301 to the terminal 226.

The fixture drive motor controls 302 are electrically connected between the terminals 211 and 227. Since the particular arrangement of the fixture drive motor controls depends upon the particular type and models of fixture drive motors used with the gravity actuated control apparatus of the present invention, and since such arrangements are well known to those ordinarily skilled in the art, the contacts of the fixture drive motor controls have been shown symbolically indicated as box 302 to preserve clarity in the description of the operation of the present invention. A pair of normally open contacts 252b and 253b of relays 252 and 253, respectively, are connected in parallel between the fixture drive motor control 302 and a terminal 299a shared in common by the fixture drive motors 99 and 99a, and a pair of normally open contacts 252c and 253c of relays 252 and 253, respectively, are connected in parallel between the fixture drive motors controls 302 and a second terminal 299b, shared in common by the fixture drive motors 99 and 99a.

In the operation of the illustrated embodiment of the present invention, the carriage 95 with the control unit G and other parts therewith are positioned for oscillatory circumferential or other peripheral movement with respect to the tubing T (FIG. 4) or other member. Initially, the pin 98 is disposed at the top center, substantially along the vertical axis of the tubing T, and then the arms 95 and 95a are pivoted with respect to each other until they are locked onto the tubing T for rotation relative thereto. Then, the locking pin 97 is inserted to prevent a release of the carriage 95 from the pipe T.

If the control unit is utilized for controlling an electrical circuit such as that illustrated, the user next depresses the "CYCLE START" button 232, energizing the "FORWARD" relay 252 over the following circuit: Terminal 208, conductor 208a, terminal 232a, pushbutton 232, terminal 232b, conductor 208b, normally closed switch 216a, conductor 208c, terminal 205g, normally closed switch 253a, relay 252, terminal 223; thereby energizing the "FORWARD" relay 252. When the "FORWARD" relay 252 is energized, the normally closed contact 252a opens, thereby preventing inadvertent energization of the reverse relay 253, with consequent damage to the equipment. The normally open contacts 252b and 252c are also closed, allowing energization of the fixture drive motors 99 and 99a, causing energization of such motors driving the carriage 95 and the parts therewith in a "FORWARD" or counterclockwise direction as indicated by the arrow in FIG. 5.

The drive motors 99 and 99a will move the apparatus circumferentially with respect to the tubing T a distance representing an arc defined by an angle of approximately 135° to the position shown in FIG. 5, and the weight W, seeking the lowermost position with respect to the canister C cause rotation of the assembly P contained within such canister with respect to such canister to a position where the cam arm 34a engages the engagement means 18a of the switch 16a (FIG. 5). It should be noted that since the arm 33a is a preselected length to correspond to the length of the flange 14a, to which the switch 16a is mounted, the engaging arm 34a will not contact or engage any other engaging means during the rotation of the apparatus from that shown in FIG. 4 to that shown in FIG. 5, since no other switch is located at the requisite distance from the rear wall member 11 of the canister C.

When the engaging arm 34a has actuated the switch 16a, the switch 216a momentarily opens, interrupting the above described energization path of the relay 252, whereupon the user releases the "CYCLE START" button 232, to preclude further energization of the relay 252.

With the apparatus in the position shown in FIG. 5, the first portion of the welding cycle can now be performed. The user of the apparatus engages the "WELD" switch 230 to its lowermost position, completing an electrical circuit from terminal 204 through conductor 204a, contact 230c, switch 230, contact 230d, terminal 204f, conductor 204g, through relay 251 to terminal 222. The user need only depress the switch 230 sufficiently long for the relay 251 to become energized over this path, since the relay 251 latches itself in an operated position over the following circuit: terminal 206, conductor 206a, normally closed contact 216c, terminal 206b, contact 251c of relay 251 which closes upon energization of the relay 251, terminal 206c, normally closed contact 254a, conductor 204e, terminal 204f, conductor 204g, relay 251, terminal 222. Energization of the relay 251 also serves to energize the welding controls 300 over the following circuit: terminal 205, conductor 205a, terminal 205b, contact 251a which closes upon energization of relay 251, terminal 205c, conductor 205d, terminal 300a, through the welding controls 300, terminal 300b, switch 251b, terminal 205h, normally closed contact 252a, relay 253, terminal 224, thereupon energizing the relay 253. Energization of the relay 251 also closes the switch 251d, allowing completion of the circuit from terminal 210, through conductor 210a, closed switch 251d, terminal 301d, weld controls 301, terminal 301c, conductor 209b to terminal 226.

Energization of the relay 253 opens the normally closed contact 253a, preventing energization of the relay 252 and consequent damage to the machinery, and closes the contacts 253b and 253c causing a reversed direction of current through the fixture drive motors 99 and 99a and a consequent reverse direction of travel of the apparatus with respect to the tubing T, shown by the clockwise arrow in FIG. 6.

Having latched itself in an operated position, the relay 251 and the relay 253 allow continued energization of welder 90 through welding controls 300 and movement of the apparatus with respect to the tubing T by motor 99 and 99a in a clockwise direction until the position shown in FIG. 6 is reached, whereupon the cam engaging arm 34b makes contact with the switch 16b, energizing the relay 254 over the following circuit: terminal 206, conductor 206a, closed switch 216c, terminal 206b, closed (upon energization of relay 251) contact 251c, terminal 206c, conductor 206e, terminal 206d, closed switch 216b, conductor 206h, terminal 206j, conductor 206m, through relay 254 to terminal 225. Energization of the relay 254 causes the normally closed contact 254a to open, thereupon breaking the energization circuit previously described for the relay 251, causing the closed contacts 251a, 251b, 251c, and 251d to open, thereupon interrupting the flow of current energizing the welder 90 through the welding controls 300 and 301. THe relay 254, upon energization, also closes the normally open contact 254b and 254c latching such relay 254 energized over the following circuit: terminal 206, conductor 206a, closed contact 216c, terminal 206b, closed contact 254b, terminal 206d, conductor 206e, terminal 206c, closed contact 254c, conductor 206f, terminal 206g, conductor 206i, terminal 206j, conductor 206m, through relay 254 to terminal 225, thereby preventing deenergization of relay 251 from interrupting the flow of current to relay 254. The flow of power to the fixture drive motors 99 and 99a is uninterrupted, since the relay 253 is held energized over the following circuit path: terminal 206, conductor 206a, closed switch 216c, terminal 206b, closed switch 254b, terminal 206d, conductor 206e, terminal 206c, closed switch 254c, conductor 206f, conductor 206k, terminal 300c, terminal 300d, conductor 206l, terminal 206n, conductor 207c, terminal 205h, normally closed contact 252a, through relay 253 to terminal 224, thereby allowing continued movement of the apparatus with respect to the tubing T by motors 99 and 99a in the clockwise direction from the position shown in FIG. 6 to the position shown in FIG. 7.

After the apparatus has moved from the position of FIG. 6 to the position of FIG. 7, the weight W, again seeking the lowermost position, causes rotation of the plate 21 with respect to the canister C to such a position that the engaging arm 34c closes the switch 16c, opening the switch 216c and thereby interrupting the flow of current energizing the relays 253 and 254 over the previously described circuit paths, thereby opening the contact 253b and 253c, deenergizing the fixture drive motor 99 and 99a, and preventing further movement of the apparatus with respect to the tubing T.

With the apparatus in the position of FIG. 7 with respect to the tubing T, the welding apparatus 91 is in a position to begin the second half of the welding cycle of the welding apparatus with respect to the tubing T.

The user of the apparatus then manipulates the "WELD" control button 230 to its uppermost "WELD FORWARD" position, energizing the relay 240 over the following circuit path: terminal 204, conductor 204b, terminal 204c, conductor 204d, through relay 250 to terminal 221. Energization of the relay 250 latches such relay in an energized position, by closing the contact 250a, over the following circuit: terminal 203, conductor 203a, normally closed switch 216d, closed switch 250a, terminal 204c, conductor 204d through the relay 250 to the terminal 221. Energization of the relay 250 closes the contacts 250b and 250c permitting energization of the welding control 300 over the following circuit: terminal 205, conductor 205a, terminal 205b, closed contact 250b, terminal 205c, conductor 205d, terminal 300a, through the welding control 300, terminal 300b, closed contact 250c, terminal 205g, closed contact 253a, through relay 252 to terminal 223, thereupon energizing the relay 252, causing consequent closure of the contacts 252b and 252c, energizing the fixture drive motors 99 and 99a and causing rotational movement of the apparatus with respect to the tubing T in a counterclockwise direction, indicated by the arrow in FIG. 8. Energization of the relay 250 also closes the contact 250d which energizes the weld controls 301 over the following circuit: conductor 209a, closed contact 250d, terminal 301a, through the weld control 301, terminal 301c, conductor 209d to terminal 226. The relay 250, latching itself in the operated position, continues energization of the welder 91 by weld controls 300 and 301, and the fixture drive motors 99 and 99a over the previously disclosed circuits, and the welder 91 completes the second half of the circumferential weld of the tubing T, continuing such rotational movement until the position shown in FIG. 8 is reached, whereupon the weight W again seeking the lowermost position, causes the plate 21 to move with respect to the canister C so that the engaging arm 34d has closed the switch 16d, causing opening of the circuit energizing the relay 230 at the switch 216d (FIG. 10) sufficiently long enough for the contact 250a to open, thereby precluding further energization of the relay 250. As the relay 250 is deenergized, the contacts 250b and 250c open, precluding further energization of the welder 91 by the weld controls 300, and of the relay 252, and the contact 250d opens, precluding further energization of the weld controls 301. The deenergization of the relay 252 opens the contact 252b and 252c interrupting the flow of power to the fixture drive motors 99 and 99a, thereby precluding further movement of the apparatus with respect to the tubing T.

After having satisfied himself that the weld has been satisfactorily completed, the user thereupon actuates the "TRAVEL" button 231 to either its uppermost or lowermost position. Actuation to the uppermost position energizes the relay 252 over the circuit: 207a, contact 231a, button 231, contact 231b, conductor 207b, terminal 207d, conductor 208c, terminal 205g, normally closed relay contact 253a, through relay 252 to terminal 223, which thereupon closes the contacts 252b and 252c, energizing the fixture drive motors 99 and 99a causing further counterclockwise rotation of the apparatus with respect to the tubing T until the position shown in FIG. 1 is reached, whereupon the user releases the button 231 and consequently stops the motors. Actuation to the lowermost position causes energization of the relay 253 over the circuit: conductor 207a, terminal 231c, button 231, terminal 231d, conductor 207c, terminal 205h, normally closed contact 252a, through relay 253 to terminal 224, and energization of the relay 253 closes the contacts 253b and 253c, energizing the fixture drive motors 99 and 99a causing clockwise movement of the apparatus with respect to the tubing T until the position shown in FIG. 4 is reached, whereupon the user releases the button 231 and stops the movement of the apparatus with respect to the tubing T.

After the apparatus has been repositioned in the position of FIG. 4, the locking means 97 is removed and the arms 95 and 95a are pivoted with respect to each other sufficiently to allow extraction of the tubing T from within the enclosing arms 95 and 95a, and making the apparatus available for a new weld or inspecting operation.

If at any time during the operation of the welding apparatus, an emergency stop should be required, the "STOP" button 202 is simply depressed, interrupting the flow of electrical power between the terminals 202a and 202b, and preventing a complete electrical circuit from being formed by any of the electrical circuitry of the present invention, thereby stopping whichever of the previously described operations of the apparatus of the present invention were currently taking place.

It should be realized that although the description of the operation of the invention (FIGS. 4-8) has been specifically described with respect to the operation of welding apparatus 90 and 91 and welding control circuits 300 and 301, the apparatus of the present invention is also useful for generating trigger or control functions at preselected points with respect to the periphery of tubing or other similar members to control the operation of other types of apparatus such as an X-ray or ultrasonic testing apparatus, used in testing for flaws, cracks or other imperfections.

It should further be recognized that although the tubing T being welded in the operation of the invention is described as being a tube, circular in cross section, the gravity actuated apparatus of the present invention can be adapted to control operations of any suitable device with respect to other configurations of structural members as well.

Furthermore, it should be recognized that the term "tubular member," when used in the specification and claims, is intended to encompass both hollow and solid tubing and rods, of circular, elliptical and other external surface configurations.

Additionally, although the switches 18 have been disclosed as mounted with respect to the rear wall member 11 of the canister C, and the cams 30 mounted with respect to the assembly P, it is equally suitable to reverse the arrangement and mount the switches 18 with respect to the assembly P and fixedly mount the cams 30 with respect to the canister C, with movement of the assembly P thereby rotating selected switches 18 into engagement with the fixedly mounted cams 30.

Also, the switches 18 which actuate according to the position of the control unit G with respect to the tubular member may, if desired, be pneumatic, hydraulic, or of other power medium which is to be controlled. The term "switches" is thus intended to encompass electrical, mechanical, pneumatic and hydraulic devices.

The foregoing disclosure and description of the invention are illustrative and explanatory thereof, and various changes in the size, shape, and materials as well as in the details of the illustrated construction may be made without departing from the spirit of the invention.

We claim:

1. A gravity actuated control apparatus for disposition on a tubular member or the like for controlling the operation of welding equipment and the like mounted with the apparatus for movement relative to a tubular member, comprising:
   a. a carriage;
   b. said carriage having means therewith for substantially arcuate movement of said carriage relative to a tubular member;
   c. a control unit mounted on said carriage for sensing preselected peripheral positions of said carriage with respect to a tubular member upon which said carriage is mounted, said control unit comprising:
      1. a support;
      2. an actuating assembly rotatably mounted on said support for at least partial rotational movements relative to said support;
      3. a weight portion eccentrically disposed with said actuating assembly to cause said actuating assembly to remain in substantially the same position during relative rotational movement of said support due to the force of gravity acting on said weight portion;
      4. at least three switches mounted at circumferentially spaced locations on said support;
      5. at least three actuating members, each actuating member for contacting a different one of said switches, said actuating members mounted at predetermined positions with said actuating assembly; and
      6. means for mounting said switches and actuating members for causing each of said actuating members to engage a different one of said switches during movement of said support means relative to said actuating assembly.

2. The structure of claim 1 wherein said means for mounting comprises:
   a ball bearing assembly mounted with respect to said support and said actuating assembly for permitting rotational movement therebetween.

3. The structure set forth in claim 2, wherein said weight portion of said control unit comprises:
   a. a weight integral with said actuating assembly, said weight being eccentrically situated with respect to said support whereby said weight will remain in a lowermost position with respect to the apparatus, thereby actuating each of said switches upon selective engagement with one of said actuating members.

4. The structure of claim 1, wherein:
   a. each of said switches is mounted a preselected different distance extending towards said actuating assembly from said support; and
   b. each of said actuating members is a preselected different length to engage an individual one of said switches.

5. The structure of claim 1, further including:
   circuit means operable at said preselected positions of said control unit for controlling the operation of a welding equipment in relationship to the peripheral position of said control unit relative to a tubular member.

6. The structure set forth in claim 5, including:
   a. drive means on said carriage for imparting the peripheral movement of said carriage thereto; and
   b. means connecting said drive means to said circuit means through said control unit so that the operation of said drive means is initiated and terminated by said control unit at predetermined positions.

7. The structure set forth in claim 6, including:
   a. a welding torch mounted on said carriage for movement therewith; and
   b. welding control means connecting said welding torch to said circuit means through said control unit for initiating and terminating the operation of the welding torch at predetermined positions.

8. A gravity actuated control unit for triggering operations of welding equipment and the like at preselected positions of the equipment during movement of the equipment along a predetermined path, comprising:
   a. a support;
   b. an actuating assembly rotatably mounted on said support for at least partial rotational movements relative to said support;
   c. a weight portion eccentrically disposed with said actuating assembly to cause said actuating assembly to remain in substantially the same position during relative rotational movement of said support due to the force of gravity acting on said weight portion;

d. at least three switches mounted at circumferentially spaced locations on said support;

e. at least three actuating members, with each actuating member for contacting a different one of said switches, said actuating members being mounted at predetermined positions with said actuating assembly; and f. means for mounting said switches and actuating members for causing each of said actuating members to engage a different one of said switches during movement of said support relative to said actuating assembly.

9. The structure of claim 8, wherein:
a. said weight portion comprises a weight integral with said actuating assembly; and
b. said actuating assembly has an aperture formed therein opposite said weight to increase the eccentricity of said weight portion with respect to said actuating assembly.

10. The structure of claim 8, wherein said weight portion includes therewith:
an additional weight mounted with said weight portion on said actuating assembly.

11. The structure of claim 8, including an electrical control circuit and wherein said switches comprise:
switches connected in said electrical control circuit and which control the operation thereof.

12. The structure of claim 8, wherein:
a. each of said switches is mounted a preselected different distance extending towards said actuating assembly from said support; and
b. each of said actuating members is of a preselected different length to engage only an individual one of said switches.

* * * * *